Sept. 12, 1944.                T. A. TE GROTENHUIS                2,357,857
                            METHOD OF MAKING CARBON BLACK
                                 Filed Aug. 22, 1939
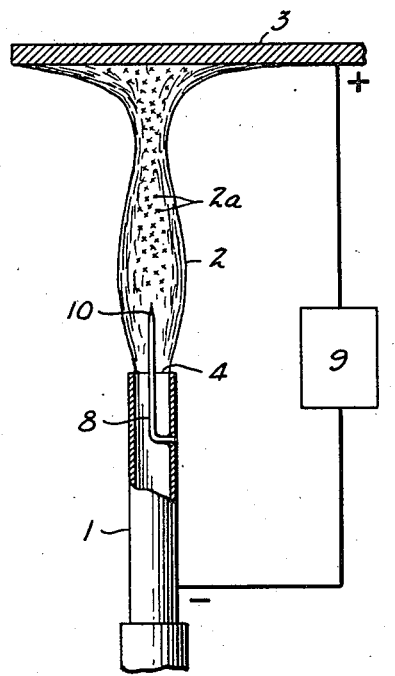
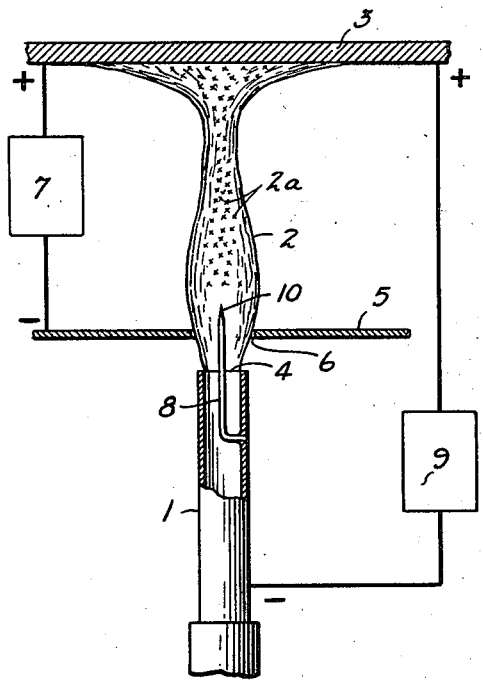
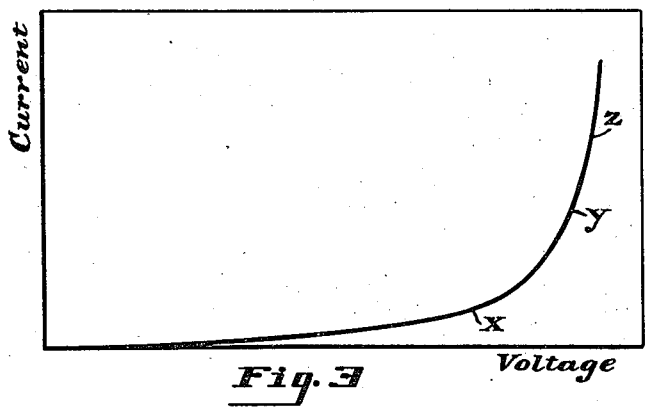
INVENTOR
*Theodore A. TeGrotenhuis*
BY
*Evans + McCoy*
ATTORNEYS Patented Sept. 12, 1944

2,357,857

UNITED STATES PATENT OFFICE 2,357,857

METHOD OF MAKING CARBON BLACK

Theodore A. Te Grotenhuis, Olmsted Falls, Ohio

Application August 22, 1939, Serial No. 291,391

4 Claims. (Cl. 204—173)

This invention relates to carbon black and to a method for preparing the same. It relates particularly to a method wherein the removal of carbon particles from the flame is accelerated and the quantity of carbon black is increased.

In the production of carbon black or channel black, natural gas is burned in a luminous flame which contacts a comparatively large mass of channel shaped iron. The iron is considerably cooler than the ignition temperature of carbon and some of the carbon particles from the gas are deposited on the channel, from which they are periodically removed.

It has heretofore been proposed to apply ultrasonic vibrations to the gas flame to increase the yield of carbon black. However, the apparatus required for the production of such vibration is very complex and expensive and cannot be applied to conventional carbon black producing equipment without substantial alterations.

It is an object of this invention to provide a method for increasing the percentage of carbon black obtained from a flame.

It is a further object of this invention to provide a method of increasing the production of carbon black which requires little modification of existing equipment.

It is a still further object of this invention to provide a method of producing carbon black of improved quality.

These objects are accomplished by applying a sufficiently strong electric field to the vicinity of the flame to accelerate the velocity of carbon particles out of the flame to the relatively cool collector plate, so that they are heated for a shorter period of time and given less opportunity for combustion.

It has been heretofore known that gas flames are conductors of electrical current and it would therefore appear that the application of an electrical potential could have no effect on the movement of any particles therein. I have found, however, that in spite of the natural conduction of the flame and the temperatures involved, that the particles of carbon in a flame respond to an electrical field. The carbon particles apparently preferentially absorb the negative ions of the flame so as to become generally negatively charged and they are therefore attracted to a positive electrode.

Referring to the drawing:

Figure 1 is a diagrammatic view with parts broken away wherein the voltage is impressed between an ionizing type of electrode in the flame and the collector plate;

Fig. 2 is a similar view wherein a voltage is impressed between the collector plate and an additional electrode;

Fig. 3 is a characteristic curve showing the current and voltage relationships of a luminous type flame.

Referring to the drawing in detail, gas is supplied substantially unmixed with oxygen at the desired rate from a suitable supply (not shown) through the burner tube 1 to produce a luminous flame 2 of sufficient size to impinge on the collector plate 3 which may be a metal channel as is customary in the art. The flame is preferably burned in a controlled atmosphere having limited oxygen supply, as is customary in the art, and the orifice 4 may be shaped to produce flames of the desired shape.

According to this invention, an electrical potential is applied by a suitable means, such as a conventional high potential direct current generator 7, between the collector plate 3 and an electrode 5 located so that relatively strong electric field will permeate a substantial portion of the luminous flame 2. The electrode 5 may be of any suitable shape such as a flat plate, disc, cylinder, ring, gauze, etc. It may be provided with an opening 6 to permit the gas to pass therethrough or may surround the end of the burner tube 1 near the base of the flame, so that substantially all of the flame is subjected to the electric field between the plates 3 and 5. By making the collector plate 3 sufficiently positive with respect to electrode 5, the charged particles of carbon 2a are drawn toward the collector plate 3 with increased velocity and the quantity produced is increased.

While, as above stated, it has been found that the carbon particles normally acquire a sufficient charge to be actuated by an electrostatic field, it is preferred to provide additional electrons so that a still stronger negative charge may be acquired by the particles of carbon and a higher acceleration thus imparted with a given potential difference. Additional electrons may be provided by any suitable means such as by applying a voltage between the collector plate 3 and a sharp pointed electrode 8 with a suitable generator 9, which, like generator 7, may be a high potential rectifier as is customarily used for dust precipitating apparatus. The point 8 is preferably located centrally of the flame, as shown, and if the radius of curvature of the point 10 is comparatively high as when it is relatively sharp, the potential gradient becomes relatively high and electrons are readily expelled into the carbon area of the flame. The electrode 8 is of heat resisting metal and is preferably coated or alloyed with an activating material having high electron emissivity, such as for example, thorium oxide or other material used on vacuum tube filaments and the like. Since the electrode 8 may be placed in a non-oxidizing position in the flame, such coatings may be amply protected. The electrode 8 may therefore be of sufficiently small diameter to be heated by the flame to a temperature of high electron emissivity.

When the burner tube 1 is of conducting material and suitably insulated from the collector 3, an electrode 5 or 8 may be electrically connected therewith as shown, and the potential applied between the tube 1 and the collector plate 3, as shown. If in a particular installation it is undesirable to use both of the electrodes 5 and 8, either one may be connected and when the burner tube is of conducting material the tube 1 may serve as a negative electrode. It is preferable, however, to use both electrodes as illustrated in Fig. 2, and apply an ionizing voltage to electrode 8 and a higher voltage between electrode 5 and collector plate 3.

The quantity of carbon black is increased to the greatest extent when the collector plate 3 is maintained at a strong positive potential with reference to the electrode 5 and 8, but it has been found that a substantial increase in the quantity of carbon black produced, is also obtained when alternating current voltage is applied between the point electrode 8 and the collector 3. With a comparatively sharp point 10 and correct voltage adjustment, the current flow has been found to take place substantially entirely when the electrode 8 is negative with respect to the collector plate 3, and although the effect is an oscillatory motion on the carbon particles, the major acceleration is toward the collector plate 3. When an alternating potential is applied between a pointed electrode 8 and the plate 3, it is preferable that the electrode 5 be either unconnected, omitted, or maintained at a very strong negative potential with respect to the collector 3.

The preferred potential to be applied between the electrodes 3 and 8 and/or between the electrodes 3 and 5 obviously depend on the characteristics of the flame, such as temperature, and physical dimensions and shape. The voltages applied will usually be several thousands of volts. When direct current potentials are used with electrodes 3, 5 and 8, it will usually be found, for example, that voltages of about 2,000 to about 5,000 or 6,000 volts are suitable for application between electrodes 3 and 8, whereas about 5,000 to 10,000 volts or more are suitable for application between the electrodes 5 and collector 3. The particular voltage impressed between electrodes depends on the conductivity and size of the flame. With more conductive or smaller flames, the desired voltages will be found to be lower.

Fig. 3 illustrates diagrammatically the current and voltage relationships which I have found to be characteristic of carbon producing flames in general. As the voltage is increased the current increases gradually until the point X is reached, and as the voltage is further increased the current increases at progressively faster rates until breakdown occurs at Z. It has been found that the voltage applied between any pair of electrodes should be maintained below the breakdown or arcing voltage Z and it should preferably be maintained near the bend of the voltage curve, as illustrated by the portion of the curve between the points X and Y of Fig. 3.

When an alternating current is used the higher frequencies appear to be more desirable, but an increased yield is also obtained with commercial lighting frequencies. While somewhat less efficient in my process, alternating current is advantageous because of its extreme ease of production and the low cost of equipment.

The fineness of the carbon black which is removed from the collector plate 3 may be varied by adjusting the potentials between the electrodes. Thus by sufficiently increasing the voltage between electrode 8 and collector plate 3, the electron density may be increased, and hence the absorbed negative charge on the particles may be increased, thereby increasing the repulsion between particles, preventing agglomeration of the particles, and producing carbon black of extreme fineness.

It will be seen that the above described method is readily applicable to existing commercial installations with a minimum of alteration, and since the quantity of carbon black recovered from a given quantity of gas is considerably increased, great economy may be effected. Since the particles are drawn solidly against the collector plate, the loss of particles by smoke is also greatly diminished.

It is to be understood that variations and modifications of the specific devices herein shown and described for purposes of illustration, may be made without departing from the spirit of the invention.

What I claim is:

1. In a process for producing carbon black wherein carbon particles are formed in a gas flame and the flame impinged upon a collector, the steps which comprise applying an alternating voltage between said collector and a comparatively pointed electrode disposed in the central portion of said flame, and superimposing an electric field on at least a portion of said flame by applying a higher unidirectional voltage between said collector and an additional relatively flat electrode to increase the velocity of the movement of the particles from the flame.

2. In a process for producing a carbon black wherein carbon particles are formed in a gas flame and the flame impinged upon a collector, the steps which comprise applying a voltage between said collector and a comparatively sharp pointed electrode which projects above the burner into said flame, and superimposing an electric field on at least a portion of said flame by applying a higher unidirectional voltage between said collector and an additional electrode of relatively large curvature to increase the velocity of the movement of the particles from the flame, the potential difference between the pointed electrode and the collector plate being insufficient to cause complete breakdown of resistance in either circuit, but sufficiently high to be situated above the straight line portion of curve showing the current and voltage relationships between said electrodes.

3. In a method for producing carbon black from a gas, the step which comprises applying a relatively high electric potential difference between the collector and an ionizing electrode which is disposed centrally of the flame inside of the burning envelope and which projects above the burner into the flame, and also applying a higher, accelerating, unidirectional potential between an additional electrode of relatively large radius of curvature located adjacent the flame and the said collector plate, the positive side of said accelerating potential being connected to said collector plate and the negative side of said accelerating potential being connected to said additional electrode, the potential difference between said ionizing electrode and said collector plate being situated in the region between the voltage of complete breakdown and the highest voltage on the straight line portion of the voltage-current curve.

4. In a method for producing carbon black from a gas, the steps which comprise burning a gas flame against a collector plate, artificially producing electrons internally of the flame at a point where combustion is not occurring for adsorption by carbon particles as they are formed by applying a high ionizing voltage between an electrode of small radius of curvature which projects into said flame and said collector, and applying a separate strong unidirectional, accelerating electric field to the vicinity of the flame to accelerate the carbon particles containing the adsorbed electrons toward a collector plate, said accelerating field being applied between an accelerating electrode and said collector plate, said collector plate being positive with respect to said accelerating electrode.

THEODORE A. TE GROTENHUIS.